Aug. 29, 1933.  E. WILDHABER  1,924,476
METHOD OF CUTTING GEARS
Filed March 19, 1928  3 Sheets-Sheet 1
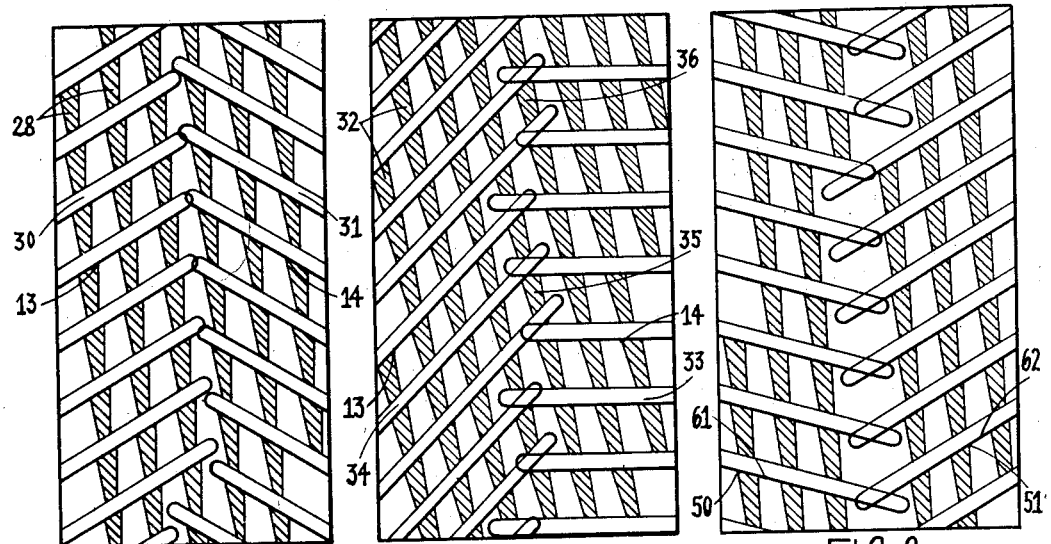
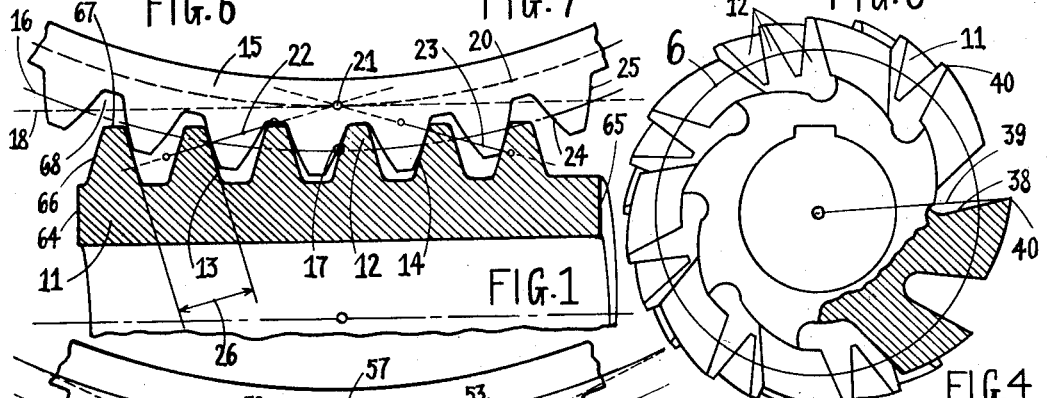
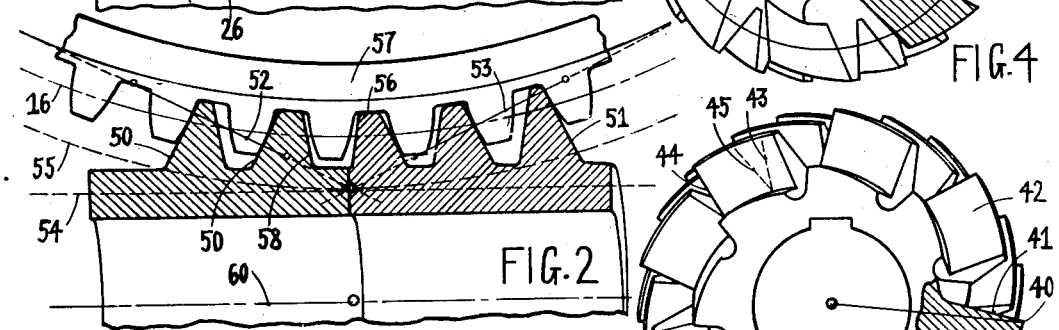
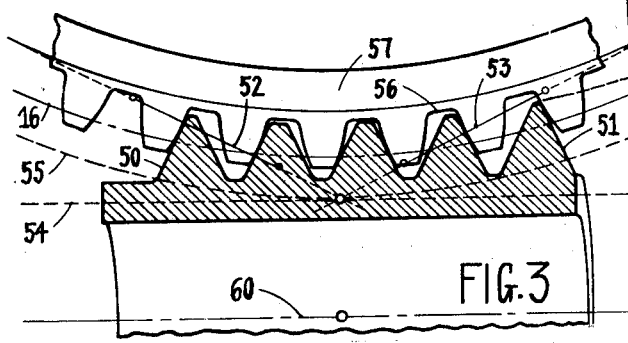
INVENTOR
Ernest Wildhaber Aug. 29, 1933.  E. WILDHABER  1,924,476
METHOD OF CUTTING GEARS
Filed March 19, 1928  3 Sheets—Sheet 2
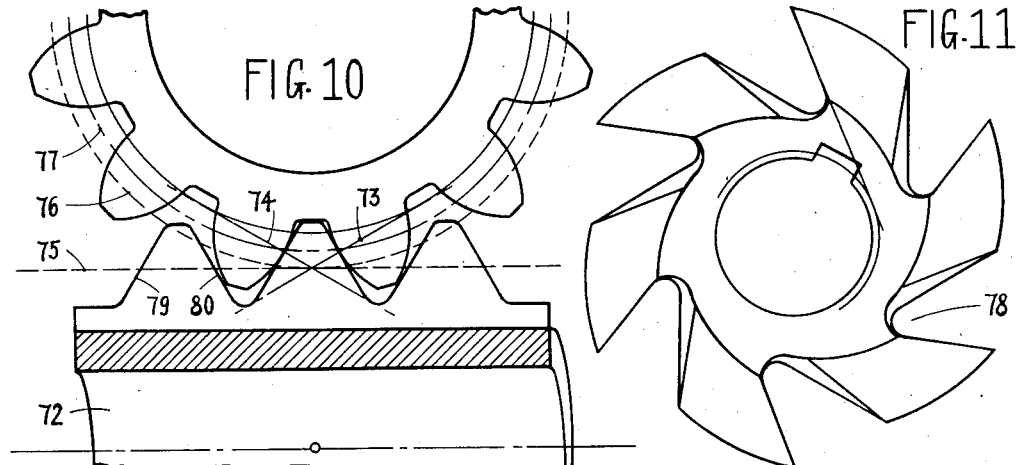
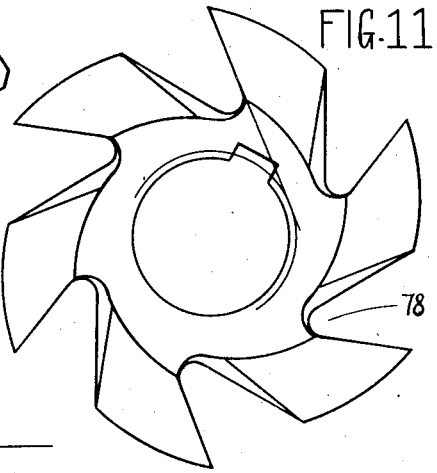
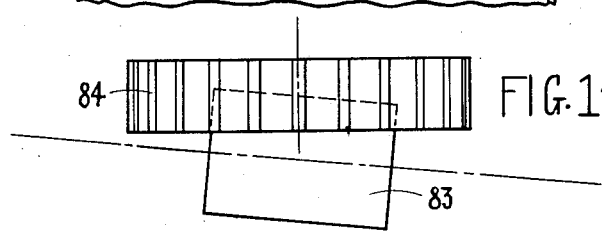
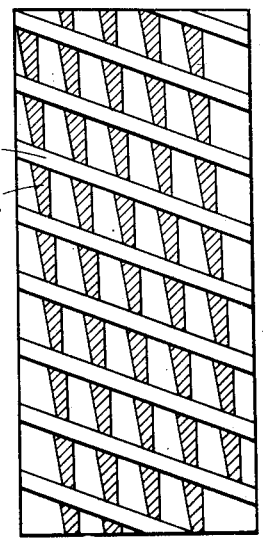
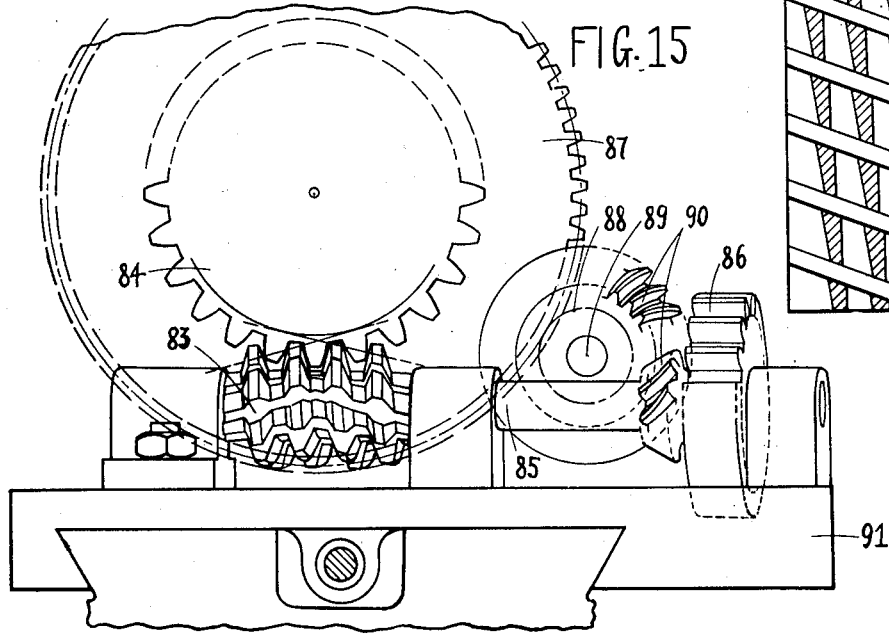
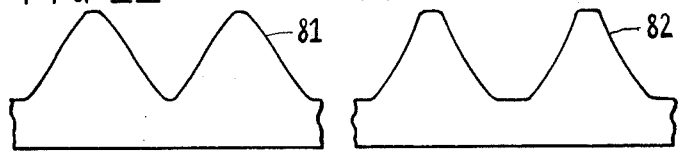
INVENTOR
Ernest Wildhaber Aug. 29, 1933.  E. WILDHABER  1,924,476
METHOD OF CUTTING GEARS
Filed March 19, 1928  3 Sheets-Sheet 3
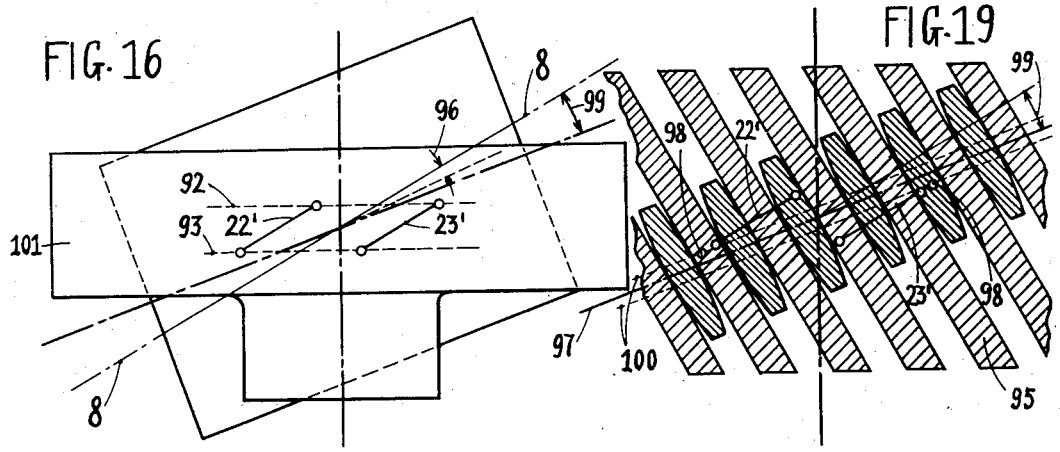
INVENTOR
Ernest Wildhaber Patented Aug. 29, 1933

1,924,476

UNITED STATES PATENT OFFICE 1,924,476

METHOD OF CUTTING GEARS

Ernest Wildhaber, Brooklyn, N. Y.

Application March 19, 1928. Serial No. 262,876

13 Claims. (Cl. 90—4)

The present invention relates to methods of cutting gears, and particularly to such methods in which a tool is rotated in engagement with a continuously rotating gear blank. Tools of this character are ordinarily known as hobs.

My invention refers to the generating type of hobbing methods. In these methods, which include all the conventional methods of hobbing, the teeth of the gear blank are generally formed by the hob in an operation corresponding to the mesh between said gear blank and a member suited to roll on said gear blank and embodied by the hob. In the case of gears which are suited to run on parallel axes said member is usually a rack, and the teeth of the gear blank are then generated from the tooth shape of said rack through its mesh with the gear blank, as well known.

One object of the present invention is to provide a hobbing method producing a superior finish on the tooth surfaces of a gear blank, as compared with known hobbing methods of the character referred to.

Another aim is to provide a hobbing method giving a smoother cutting operation and a method consuming less energy or power.

A still further object is to effect an increased output of gears.

Another object is to provide a method for cutting helical and herringbone gears with a reduced feeding distance.

Other objects will be apparent in the course of the specification and from recital of the appended claims.

My invention is illustrated by way of examples in the accompanying drawings, in which:

Fig. 1 is a partial section of a hob, the section being taken substantially in the direction of the hob axis, and a partial view of a gear blank shown in engagement with said hob. Fig. 1 is illustrative of an embodiment of my invention preferably applied to gears with large numbers of teeth.

Fig. 2 is a partial section of another hob, shown in engagement with a gear blank, of which only a portion is shown. Fig. 2 illustrates a modified embodiment of my invention.

Fig. 3 is a partial section of a further hob, and a partial view of a gear blank in engagement with said hob. Fig. 3 is illustrative of an embodiment of my invention preferably applied to gears with moderate numbers of teeth.

Fig. 4 is an end view of the hob shown in Fig. 1, partly a section taken at right angles to the axis of the hob.

Fig. 5 is an end view partly in section of a hob of the general type indicated in the Figures 2 and 3.

Fig. 6 and Fig. 7 are developments at a reduced scale of hobs of the general type indicated in the Figures 1 and 4, illustrative of two arrangements of flutes. The periphery 6 (Fig. 4) has been developed into a plane.

Fig. 8 is a development at a reduced scale of the circumference of a hob of the general type illustrated in the Figures 2 and 3.

Fig. 9 is a development of a roughing hob.

Fig. 10 is a partial section of a hob, said section being taken substantially in the direction of the hob axis, and a partial view of a gear blank in engagement with said hob. Fig. 10 illustrates an embodiment of my invention preferably applied to gears with small numbers of teeth.

Fig. 11 is an end view of the hob shown in Fig. 10.

Fig. 12 and Fig. 13 are sections through racks of increased profile inclination or increased pressure angle, such as may also be represented or embodied with hobs in accordance with the present invention. It is noted that the profiles of the racks are curved, and that the racks therefore correspond to noninvolute gears.

Fig. 14 is a plan view of a gear blank in engagement with a hob.

Fig. 15 is a front elevational view corresponding to Fig. 14 and indicating in addition the chief parts of a simplified device for generating gears.

The Figures 16 to 20 illustrate a preferred embodiment of the present invention as applied to helical and herringbone gears.

Fig. 16 and Fig. 17 are plan views of a helical gear and of a hob in engagement therewith, illustrative of two different settings of the hob, the preferred setting being illustrated in Fig. 16.

Fig. 18 is a normal section through the teeth of a helical gear, along lines 8—8 of Fig. 16 and Fig. 17, and a section through the thread of a hob engaging with said teeth. Part of said gear is shown in view. Fig. 18 corresponds to both Fig. 16 and Fig. 17.

Figures 19 and 20 are plane sections through the threads of the hobs indicated in the Figures 16 and 17 respectively, and through racks which are conjugate to said threads.

In Fig. 1 and Fig. 4, the numeral 11 denotes a hob having a plurality of cutting teeth 12, which are provided with cutting edges such as 13, 14.

Hob 11 embodies or represents a rack through its position and motion relatively to gear blank 15. In the case illustrated in Fig. 1, said rack contains straight or approximately straight profiles, characteristic to the involute system of gears.

According to conventional practice, a hob embodies a rack, which meshes with the gear blank 15 while rolling on the pitch circle 16 of the gear blank. That is to say said rack meshes with the gear blank exactly in the same way as a mate gear meshes with said gear blank. The two lines of action which correspond to the two sides of the teeth intersect then in a point 17 of the pitch circle, as well known.

The rack embodied by hob 11 has a different and smaller pressure angle, than the pressure angle at which the gear blank meshes with a mate gear. The said rack meshes with gear blank 15 in such manner, that a line 18 of the rack rolls on a circle 20 of the gear blank. The two lines of action 22, 23 between said rack and the blank intersect then in point 21 of circle 20, namely in the point at which the rolling contact takes place, that is to say at the instantaneous axis of relative motion, as is known.

It is also known, that exactly the same tooth profiles 24, 25 may be formed on the gear blank by a rack having a pressure angle different from the pressure angle of the gear blank, and by a rack having a pressure angle equal to the pressure angle of the gear blank, as long as the perpendicular pitch 26 (Fig. 1) is the same on the two racks.

By providing a hob as indicated in Fig. 1, the lines of action 22, 23 between rack and gear blank have been separated in the zone of the teeth. Inasmuch as the finishing cuts are applied to the gear blank 15 along these lines 22, 23, the finish cutting edges 13 which finish along line 22 form a group separate from the group constituted by the finish cutting edges 14, which finish along line 23.

In accordance with the present invention different cutting faces are provided adjacent the cutting edges 13 and adacent the cutting edges 14. The cutting faces adjacent the cutting edges 13 are formed by flutes or gashes of such inclination as to form keen cutting edges 13. And the cutting faces adjacent cutting edges 14 are so inclined as to furnish keen cutting edges 14. In other words the cutting faces contain a rake, in such manner that the cutting angle is smaller than 90° in any point of a cutting edge 13, and of a cutting edge 14 respectively.

Preferably helical cutting faces of different inclination are provided. Reference is made to the developments Fig. 6 and Fig. 7, which relate to a hob containing a single thread and to a hob containing multiple threads respectively.

In Fig. 6 relieved cutting teeth 28 are arranged in the form of a single thread, and flutes 30, 31 of different inclination are provided, to form keen finish cutting edges 13 and 14 respectively. The cutting faces are formed on the sides indicated in heavy lines, that is to say on the sides facing towards the ends of the hob. Preferably the flutes 30, 31 are equal in number, and moreover are preferably made helical, that is to say they extend along helices on the surface of the hob, and are indicated by straight lines in development. It is seen that the two systems of flutes 30, 31 constitute what might be termed herringbone flutes. They are of opposite hand, and it is noted that the flutes 31 are of a hand equal to the hand of the hob thread, namely of right hand in the example illustrated. The flutes are seen to reach into or even over each other. For convenience the geometric lines of intersection of the flute surfaces are not shown in the drawings.

The flutes 30, 31 provide a side rake adjacent the finish cutting edges 13 and 14 respectively, so as to effect cutting angles smaller than 90° along the whole length of the finish cutting edges. The cutting angle is herein defined in correspondence with known practice as the angle included between the cutting face and the plane tangent to the cutting edge and extending in the direction of relative motion of the cutting edge, that is to say the angle included between the cutting face and the plane tangent to the unrelieved thread of the hob.

In Fig. 7, the cutting teeth 32 of the hob are arranged in the form of multiple threads and in consequence furnish a larger inclination of the thread, or a larger lead angle. When the lead angle is large enough, straight flutes 33 extending in the direction of the hob axis may be provided instead of the helical flutes 31 of Fig. 6, to effect keen cutting edges 14. Helical flutes 34 are disposed so as to effect keen cutting edges 13, that is to say to effect a side rake adjacent said cutting edges. The flutes 33, 34 are seen to be arranged also somewhat in the matter of herringbones.

To resharpen the cutting edges, the flutes are reground, as well known. Small grinding wheels are required especially in the case illustrated in Fig. 6, according to which every cutting tooth is utilized and provided with a rake either one way or the other. In the embodiment indicated in Fig. 7 some of the cutting teeth, such as teeth 35, 36 are not provided with keen cutting edges. The edges of these teeth stand back from the unrelieved thread, and do no cutting work. Such teeth could be removed, if so desired. When renouncing the cutting action of some of the centrally located cutting teeth (35, 36) the flutes (33, 34) may be reground with a larger grinding wheel. This applies to hobs with single threads as well as to hobs with multiple threads, and is preferably practiced in either case.

The profile of the cutting faces, in a plane at right angles to the axis of the hob, may be made radial in analogy with the conventional shape of helical flutes. Preferably however nonradial flutes are provided such as for instance indicated in Fig. 4, where 38 denotes a nonradial profile, a radial line being shown for comparison at 39. A cutting face of this character contains a front rake as well as a side rake. The front rake is known to improve the cutting action especially of the tops 40 of the cutting teeth.

In Fig. 5 another type of nonradial profile 41 is illustrated. Flutes of this character may be provided on finishing hobs, in which the tops 40 of the cutting teeth do practically no cutting. Hobs having flutes of this character can be ground on the relieved sides 42 of their teeth somewhat easier with the known methods of relief grinding, because the grinding line or line of grinding contact (43 in Fig. 5) is more in the direction of the cutting edge 44. When a front rake is provided the grinding line would still be substantially like 43, whereas a cutting edge would have a direction 45, at an angle to line 43. A coincidence of cutting edge and grinding line is found to be an advantage in practice, on account of reduced interference between the grinding wheel and a cutting tooth adjacent to the one which is in grinding contact.

In the embodiments indicated in Fig. 2 and Fig. 3 the finish cutting edges 50, 51 are facing the outside ends of the hobs. The finishing cuts are applied along lines of action 52, 53 of increased pressure angle, as compared with the pressure angle of the gear blank, whereas according to Fig. 1 the lines of action 22, 23 correspond to reduced pressure angles. The racks embodied through the hobs in accordance with Fig. 2 and with Fig. 3 mesh with the gear blanks in a manner that the lines 54 of the racks roll on the circles 55, which are different from the pitch circles 16.

Embodiment Fig. 2 and embodiment Fig. 3 differ from each other somewhat in the outside shape of the hobs. According to Fig. 2 the outside of the hob follows the tooth bottoms 56 of the blank 57. In Fig. 3 the outside surface of the hob is also curved lengthwise, but the radius of curvature is larger than the root radius of the gear blank. The outside surface of the hob may also be made cylindrical. Generally the outside surface of any hob operating according to the present invention may be shaped as may be desired, as a cylindrical surface, or as a surface of concave lengthwise profile, or as any other suitable surface. So the hob of Fig. 1 and Fig. 4 is not confined to a cylindrical outline, but may also have a concave or other outline in lengthwise direction.

While according to Fig. 3 a single hob is provided, a double hob or two hobs are shown in Fig. 2 for finishing the two sides of the teeth of a gear blank. In this case the two sides 50, 58 of the hob thread are preferably made of different inclination with respect to the hob axis 60.

In correspondence with the different position of the finish cutting edges, hobs of the type illustrated in the Figures 2, 3 and 5 are provided with cutting faces 61, 62 (Fig. 8) which face towards the center of the hob, to effect keen cutting edges 50, 51 by providing a side rake.

The relief of the hob teeth may be made inwardly, and equal to the ordinarily used known relief. This relief is sometimes known as radial relief. However side relief or axial relief may also be used, in short any known type of relief may be applied to the hobs operating in accordance with the present invention.

In the embodiments of the present invention so far described, the cutting edges for finishing the two sides of the teeth were arranged in separate groups, and disposed on different cutting teeth. A cutting tooth then contains only one finish cutting edge, and it is therefore possible to provide on said cutting tooth a cutting face, which suits said finish cutting edge and effects a keen finish cutting edge. The principle of separating the finish cutting edges and providing suitable cutting faces on the respective cutting teeth is not confined to hobs but can be applied more broadly, for instance also to planing tools of rack shape. The rack section of Fig. 1 can namely be considered as part of a rack shaped planing tool, as well as part of a hob.

Hitherto it had been a question of finishing hobs only. Inasmuch as the roughing action differs substantially from the finishing action of hobs, a word will now also be said about roughing and roughing hobs. Imagining that in Fig. 1 the directions of rotation are such, that the side 64 of the rack section is rolled into the blank and the other side 65 is correspondingly rolled out of engagement with the blank, then it is seen that for instance the edge 66 and top edge 67 cover substantial areas in said rolling motion, and that in consequence these cutting edges will remove much stock from the tooth space 68 in the roughing operation. On the other hand, when finishing a gear blank which had been well roughed out, edge 66 will simply move into a space previously cut out and do no cutting.

In the hobs described with reference to the Figures 1 to 8, the cutting face is made to favor the finish cutting edges (13, Fig. 1) so much, that the cutting angle on the opposite edges is somewhat blunt. Edge 66 of a finishing hob furnishes therefore not as good a cutting action as is desirable to remove the considerable amount of stock during roughing.

A consideration of Fig. 1 reveals that the finish cutting edges 13 confine their action to finishing only and that they do not remove much stock. In the roughing operation, where the bulk of the material is removed by the edges 66 and 67, it is therefore unimportant whether or not the edges 13 are very keen, as long as the edges 66 and 67 are keen and provide a good cutting action. For this reason I do not provide the described herringbone type of flutes on hobs according to Fig. 1 and Fig. 4, when such hobs shall serve for roughing only. A single system of flutes is preferably provided on roughing hobs, containing front rake and side rake. When the roughing hob of the type indicated in Fig. 1 is single threaded, I preferably provide helical flutes of a hand equal to the hand of flutes 31 in Fig. 6, and when the roughing hob is multiple threaded I may provide either helical flutes or straight flutes extending parallel to the hob axis. The profile of a flute is made preferably as indicated in Fig. 4 at 38. Fig. 9 shows a roughing hob in development. Its flutes 70 are helical and are seen to have the same hand as the hand of the hob thread 71.

While I have described roughing hobs only with reference to the embodiment of Fig. 1 it is understood that the described principles may be generally applied, and that flutes of such character are provided which favor the cutting edges doing most of the cutting work. The flutes of roughing hobs are then generally different from the flutes of finishing hobs.

When the tooth number of the gear blank is small, it is found difficult to completely separate the cutting teeth for finishing the two sides respectively of the teeth of the gear blank. A hob 72 embodying a rack of increased pressure angle is then preferably provided, see Fig. 10. The said rack meshes with the gear blank along lines 73, 74 in such manner that a line 75 of the rack rolls on a circle 76 of the gear blank. Circle 76 is seen to be outside of the pitch circle 77. The hob 72 is preferably provided with straight flutes 78 (Fig. 11) extending in the direction of the hob axis and containing a front rake. The cutting faces of the hob are therefore not radial, but hooked or undercut. A front rake favors the two sides 79, 80 of the cutting teeth equally, as is known, and the more, the larger the inclination of said sides, that is to say the larger the pressure angle of the hob. The combination of a hob having an increased pressure angle and front rake, in accordance with the present invention, is therefore particularly advantageous for cutting gears having small numbers of teeth.

The Figures 12 and 13 are to indicate, that the present invention is not confined to involute gears, but can be applied to any other kind of gears as well. In the case of gears other than involute gears, the rack profiles will not be straight, but will be curved, for instance as shown at 81 and 82.

From what has been said it is evident, that the present method can be carried out on existing hobbing machines. The present method differs from the conventional methods of hobbing through the shape of the hob and frequently also through the angular setting of the hob. In a preferred embodiment of the invention, a hob embodies and represents through its shape and its position a rack of different pressure angle as compared with the pressure angle at which the gear blank is to mesh with a mate gear. In addition a hob contains cutting faces with a rake, so as to effect cutting angles smaller than 90° on the cutting edges for finishing either side of the teeth of the gear blank. The motions of tool and blank correspond to known practice. Hob and blank are rotated in timed relation on their respective axes, while a feeding motion is provided between hob and blank, ordinarily in the direction of the axis of the blank.

An elevational view of a simplified device for hobbing gears in accordance with the present invention is shown in Fig. 15, while Fig. 14 shows the relative position of tool and blank in plan view. A hob 83 of a character as described, is shown in engagement with a gear blank 84. The hob 83 contains a rake so as to effect cutting angles smaller than 90° on the finish cutting edges for finishing one side of the teeth of a gear blank as well as on the finish cutting edges for finishing the other side of said teeth. Through its shape and its position hob 83 embodies or represents a rack having a pressure angle other than the pressure angle of the gear blank 84. Hob 83 is rotated on its axis 85 by applying motion to a gear 86 in any suitable known manner. Gear blank 84 is turned on its axis in timed relation to the hob by means of a gear 87, which receives motion from a pinion 88. The latter is operatively connected with the hob 83 through shaft 89 and hypoid gears 90. During the cutting operation, the slide 91 on which the hob is mounted, is fed in the direction of the axis of the blank.

An application of the present invention to helical and herringbone gears will now be described with reference to the Figures 16 to 20. When exactly the same principles are applied to the production of helical teeth as have been described particularly for straight teeth, it is usually found that the two sides of the teeth are finished along lines 22, 23, (see Fig. 17 and Fig. 18) which are displaced relatively to each other in the direction of the axis of the gear blank 101. In other words one side of the teeth is finished somewhat ahead of the other. While this feature does not convey any inaccuracy or error, it is considered a drawback, because it necessitates an increased distance of feed, and in the case of herringbone gears it also necessitates an increase clearance between the helical teeth of opposite hand, as is readily understood.

It is generally desirable to finish the two sides of the gear teeth along lines of substantially equal position relatively to the axis of the gear blank, that is to say relatively to the direction of feed. Referring to Fig. 16, it is desirable to finish the two sides of the gear teeth along lines 22', 23', whose end points lie substantially in the same planes 92, 93 perpendicular to the gear axis. To this end a new feature is added, as will now be described:

We will consider a plane section through the hob thread, along lines 94—94 of Fig. 18, the sectional plane being offset from the hob axis a distance equal to the mean radius of the hob thread. Reference is made to Fig. 20, which shows the hob thread in engagement with an imaginary rack 95 having a contour equal to the rack teeth shown in Fig. 18.

When the hob is set to its lead angle 96 at the said mean radius, then the hob thread will contact with the shown rack section in points of its projected axis 97, and the projected lines of action 22, 23 between hob and gear blank will pass through points 98 of projected axis 97, the location of which points 98 can be determined from Fig. 18.

When however the hob is set to an angle 99 different from said lead angle, and in the present instance larger than said lead angle, then the hob thread may be made to contact with the shown rack section in points of lines 100, see Fig. 19. Lines 100 are parallel to the projected hob axis 97 and offset from said axis an amount proportional to the difference between the setting angle of the hob and its mean lead angle. The setting angle is herein understood to be the angle between the hob axis and the projected normals of the rack teeth. The points 98 are then located on the lines 100 (Fig. 19) and their location is seen to effect a desirable equal axial position of the two lines 22', 23'.

In the case of helical teeth or double helical or herringbone teeth, the hob is therefore preferably set to an agle other than its lead angle, in such a way as to effect finishing lines 22', 23' of about equal position axially of the gear blank.

A mathematical analysis reveals that for producing involute gears, the thread surface of a hob set in accordance with Fig. 19, is still an involute helicoidal surface, containing involutes in sections at right angles to the axis of the thread. Moreover the perpendicular pitch or normal pitch, that is to say the pitch in the direction of the perpendicular to the thread surface (26 in Fig. 1), remains the same and is independent of the setting of the hob. The perpendicular pitch of any hob should always be equal to the perpendicular pitch of the involute gear teeth.

A general method will now briefly be described for determining the characteristics of hob threads. This method is applicable for any system of gears, whether involute or noninvolute.

First the rack is determined on which the generation of a gear shall be based. This is done by applying the considerations previously set forth, which call for a rack of reduced pressure angle, when the tooth number of the gear blank is large; and which call for a rack of increased pressure angle, when the tooth number of the gear blank is small. An angular setting is then tentatively assumed for the hob axis, the setting angle corresponding to an angle larger or smaller than the mean lead angle of the hob thread, depending on whether the pressure angle of the embodied rack has been reduced or increased respectively, as compared with the pressure angle of the gear blank. The shape of the hob thread is then experimentally determined as the thread conjugate to a known rack. This known problem can be solved in known manner by covering the surface of said rack with a moving cutting tool, while providing such motion between tool and hob thread as corresponds to the mesh between said rack and said hob thread. The hob thread is then brought into mesh with a gear equal to a finished gear blank, and the lines described on the tooth surface of said gear by the moving points of contact are then experimentally determined, for instance in known manner by covering the tooth surfaces with red lead and watching the spots rubbed off through the tooth contact. If the location of the tooth contact is not found satisfactory at first try, the procedure may be repeated a second time.

The described experimental way of determining the surface of a hob thread contains the advantage of being very broadly applicable. In the case of involute gears it is however unnecessary and is then preferably replaced by accurate computation.

The feature of setting the hob to an angle other than its lead angle, relatively to a direction normal to the teeth of the embodied rack, may be used independently of the other features of the invention, if so desired.

It is understood that such changes and modifications may be made in my invention, as fall within the scope of the appended claims.

What I claim is:

1. The method of generating gears, which consists in providing a hob having two groups of cutting edges suited to finish the two sides respectively of the teeth of a gear blank, said cutting edges being inclined to planes perpendicular to the hob axis at angles larger than four degrees (4°), all the finish cutting edges of one group being disposed on other cutting teeth than the finish cutting edges of the other group of the hob, in providing flutes of different inclination on the two groups to form keen cutting edges, in positioning the hob in engagement with a gear blank, in rotating hob and blank in timed relation, the shape of the hob and its position being such that said hob represents a toothed member rolling on a surface other than the pitch surface of the gear blank, and in providing feeding motion between hob and blank in the direction of the axis of the blank.

2. The method of generating gears, which consists in providing a hob having two groups of cutting edges suited to finish the two sides respectively of the teeth of a gear blank, said cutting edges being inclined to planes perpendicular to the hob axis at angles larger than four degrees (4°), in providing flutes of different inclination on said two groups to form keen cutting edges, in positioning the hob in engagement with a gear blank, in rotating hob and blank in timed relation, the shape of the hob and its position being such that said hob represents a toothed member meshing with the gear blank while said member rolls on a cylindrical surface concentric with the gear blank, and in providing feeding motion between hob and blank in the direction of the axis of the blank.

3. The method of generating gears, which consists in providing two groups of cutting edges suited to finish the two sides respectively of the gear blank, said cutting edges being inclined to planes perpendicular to the hob axis at angles larger than four degrees (4°), in providing helical flutes of opposite hand on said two groups to form keen cutting edges, in rotating said cutting edges on a common axis in engagement with a gear blank, in rotating said gear blank, the shape and the position of said cutting edges being such that said cutting edges represent a rack meshing with the gear blank, and in providing feeding motion between cutting edges and blank in the direction of the axis of the blank.

4. The method of generating gears, which consists in providing a hob having two groups of cutting edges suited to finish the two sides respectively of the teeth of a gear blank, said cutting edges being inclined to planes perpendicular to the hob axis at angles larger than four degrees (4°), in providing flutes of different inclination on said two groups to form keen cutting edges, in positioning the hob in engagement with a gear blank, in rotating hob and blank in timed relation, the shape of the hob and its position being such that said hob represents a rack meshing with the gear blank, and in providing feeding motion between hob and blank.

5. The method of cutting gears of constant profile, which consists in providing a hob having two groups of cutting edges suited to finish the two sides respectively of the teeth of a gear blank, said cutting edges being inclined to planes perpendicular to the hob axis at angles larger than four degrees (4°), in providing helical flutes of opposite hand on said two groups to form keen cutting edges, in rotating hob and blank in engagement with each other, and in providing feeding motion between hob and blank.

6. The method of cutting gears, which consists in providing two groups of cutting edges suited to finish the two sides respectively of the teeth of a gear blank, said cutting edges being inclined to planes perpendicular to the hob axis at angles larger than four degrees (4°), in providing flutes of different inclination on said two groups, the profile of the flutes of at least one of the groups being nonradial in a plane at right angles to the axis of rotation, in rotating said cutting edges on a common axis in engagement with a gear blank, in rotating said blank, and in providing feeding motion between said cutting edges and said gear blank.

7. The method of generating gears, which consists in providing a gear blank, and a hob having cutting teeth disposed in a thread, the pressure angle of said thread being larger than one half of the pressure angle of said gear and differing from the pressure angle of said gear in a manner that the cutting teeth for finishing the two sides of the gear teeth have different positions with respect to the hob axis, in providing cutting faces of different general inclination on the cutting teeth for finishing said two sides respectively, in rotating said hob and said gear blank in engagement with each other, and in providing feeding motion between said hob and said gear blank in the direction of the axis of the gear blank.

8. The method of generating gears, which consists in providing a gear blank, and a hob having cutting teeth disposed in a helical thread, the pressure angle of said thread being smaller than the pressure angle of said gear and larger than one half of said pressure angle, so that the cutting teeth for finishing the two sides of the gear teeth have different positions with respect to the hob axis, in providing cutting faces of different inclinations on said cutting teeth, in rotating said hob and said gear blank in engagement with each other, and in providing feeding motion between said hob and said gear blank in the direction of the axis of the gear blank.

9. The method of generating gears, which consists in providing a gear blank and two separate groups of cutting edges for cutting the two sides respectively of the teeth of said gear blank, said cutting edges being arranged in a thread whose pressure angle differs from the pressure angle of the gear to be cut and being larger than one half of said pressure angle, in effecting acute cutting angles on said cutting edges by providing flutes of opposite hands on said two groups, in rotating said cutting edges on a common axis in engagement with said gear blank, in turning said blank on its axis in timed relation to the rotation of said cutting edges, and in effecting feeding motion between said cutting edges and said gear blank lengthwise of the axis of said gear blank.

10. The method of generating gears, which consists in providing a gear blank and a hob having cutting edges disposed in a helical thread, the two sides of said thread being formed to mesh with the desired gear along two lines of action askew to one another and whose pressure angles differ from the pressure angle of said gear, in rotating said hob and said gear blank on their respective axes in timed relation to each other, and in effecting feeding motion between said hob and said gear blank in the direction of the axis of the gear blank.

11. The method of generating gears, which consists in providing a gear blank and a hob having cutting edges disposed in a helical thread, the two sides of said thread being formed to mesh with the desired gear along two lines of action askew to one another and whose pressure angles are smaller than the pressure angle of said gear, in rotating said hob and said gear blank on their respective axes in timed relation to each other, and in effecting feeding motion between said hob and said gear blank in the direction of the axis of the gear blank.

12. The method of generating helical gears, herringbone gears and worms, which consists in providing a gear blank and a hob having cutting edges disposed in a helical thread, the two sides of said thread being formed to mesh with the desired gear along two lines of action askew to each other, said lines of action being displaced substantially in the direction of the gear periphery with respect to each other, in rotating said hob and said gear blank on their respective axes in timed relation to each other, and in effecting feeding motion between said hob and said gear blank in the direction of the axis of the gear blank.

13. The method of generating helical gears, herringbone gears and worms, which consists in providing a gear blank and a hob having cutting edges disposed in a helical thread, the two sides of said thread being formed to mesh with the desired gear along two lines of action askew to each other and whose pressure angles are smaller than the pressure angle of said gear, said lines of action being displaced substantially in the direction of the gear periphery with respect to each other, in rotating said hob and said gear blank on their respective axes in timed relation to each other, and in effecting feeding motion between said hob and said gear blank in the direction of the axis of the gear blank.

ERNEST WILDHABER.